Patented Sept. 13, 1938

2,129,919

UNITED STATES PATENT OFFICE 2,129,919

SOLID STARCH AND METHOD OF PREPARING THE SAME

Howard File, Decatur, Ill., assignor to A. E. Staley Manufacturing Company, Decatur, Ill., a corporation of Delaware No Drawing. Application July 8, 1935, Serial No. 30,351. Renewed March 11, 1938

13 Claims. (Cl. 134—19)

The present invention pertains to starch products, and has particular reference to the production of corn starch in solid masses of predetermined form.

For many years efforts have been made to satisfy the popular demand for lump corn starch by heating the starch to partially tumefy the same and thereafter compressing the moist starch under high pressure. After curing and drying the resulting product, the starch was broken into irregular lumps of smaller size and packaged in the usual manner.

A principal object of the present invention is the production of corn starch in solid masses having a predetermined form and being of such texture and composition as to maintain this form under the conditions of handling to which the material ordinarily is subjected.

An additional object is the provision of compressed starch masses which will retain their shape without undue powdering or breaking up under normal conditions of handling and at the same time will quickly break up or disseminate when treated with an aqueous medium, as when used for laundering purposes.

A still further object is the provision of a unitary corn starch mass of definite shape, composition and weight.

Another object is the provision of an improved laundry starch combined in a unitary mass with an auxiliary agent adapted to facilitate the use of the starch.

These and other objects and advantages will be evident from the following description of the invention.

During its manufacture, corn starch is separated from the other constituents of the corn and the starch is washed to remove undesirable quantities of impurities, such as corn solubles. The resultant starch is wet and after the process of drying the starch is in the form of a mixture of small irregular particles mixed with fine powder, this mixture being known to the trade as "pearl starch". Dried corn starch of this character normally will contain a moisture content of the order of 10–12 per cent. In such condition the dry corn starch cannot normally be formed into a unitary mass. The material may be subjected to compression, but there will not be formed a corn starch pellet which will retain its shape.

However, I have found that by proper treatment corn starch may be combined into unitary masses of predetermined weight and composition and that the resulting masses will be of such nature as to rapidly disseminate in the presence of water.

In the production of the polyhedron masses of corn starch, the starch is reduced to granular form and preferably of such a state of granulation that 60 per cent or more will be retained on a 30 mesh screen. With this granular starch is mixed an additional material consisting of dried and finely divided glucose or corn syrup. The dried glucose may be produced by providing a glucose solution of approximately 21° to 23° Baumé gravity and spray-drying the solution at a temperature which may be of the order of 180° F. The resulting solid corn syrup will have a moisture content of approximately 2 per cent and as the material is removed from the spray dryer it is desired to cool it rapidly in order to prevent caking of the particles. The spray-dried corn syrup in a finely pulverized condition free from lumps is intimately mixed with the powdered starch. After a thorough intermixture of the starch and dried glucose, water in the form of a fine spray is added to the mixture, the mixture being simultaneously agitated. The amount of water added is relatively small and after thorough intermingling of the water, corn starch and dried corn syrup, the mixture still will be dry and free flowing.

The characteristics of the corn starch in several respects, for example as a laundry product, may be improved by adding to the starch an oleaginous material, such as a fatty acid. Stearic acid is a desirable substance to be used in this connection. The auxiliary agent also assists in the production of polyhedron masses from the corn starch. After the moistened starch and dried corn syrup mixture is well agitated, the stearic acid is added thereto and the mixture again is subjected to agitation or mixing.

To insure that the materials are in the proper granular form the mixture may be passed through a suitable granulator. Thereafter the mixture is subjected to compression in a suitable device, such as has been employed heretofore in the production of tablets and the like from various finely divided materials. A die of any desired shape may be employed to give a polyhedron-shaped mass of proper contour. During the pressing operation the materials are maintained at a relatively cool temperature.

As a specific example of the production of polyhedron masses of corn starch, approximately 909 pounds of pearl starch containing approximately 10 per cent moisture and of such a state of granulation that 60 per cent or more will be retained on a 30 mesh screen is mixed with approximately 40 pounds of spray-dried glucose until an intimate mixture results. Water then is added by means of fine sprays until the mixture has a total moisture content of approximately 13½ per cent, the powdered materials being thoroughly agitated or mixed during the addition of the water. In this particular instance approximately 43 pounds of water are necessary to bring the moisture content to substantially 13½ per cent. After the moistened starch is well mixed, approximately 8 pounds of powdered stearic acid is added and the mixture again is thoroughly agitated.

It is desirable that the moisture content of the original starch be relatively low at the time of the addition of the dried corn syrup and, likewise, that the final moisture content of the mixture be low. Satisfactory results have been obtained by maintaining the final moisture content then within the range of 13 per cent to 14 per cent. Naturally, operating conditions will be met within which the limits will vary to some extent.

After the final mixture of dried materials has been produced and the desired amount of moisture is added, the powdered materials are at once subjected to compression to form the polyhedron masses. If the moistened materials are kept for too long a period of time prior to the formation of the polyhedron masses, the masses will be of less mechanical strength than if acted upon at once.

Ordinarily it will be found that approximately 4 per cent of the spray-dried corn syrup is sufficient to add to the corn starch. Smaller quantities of the dried corn syrup result in polyhedron masses of a smaller degree of hardness, while larger quantities of the dried corn syrup and larger quantities of water or, in some cases, insufficient mixture of the water will cause the formation of polyhedron masses of a harder nature that will disseminate less readily in water.

It is desirable to form the polyhedron masses of such shape as to facilitate the packaging of the corn starch. After formation of the polyhedron masses the starch may be packed in symmetrical formations in cartons. In some cases the polyhedron masses will be tumbled into a package without any effort being made to position the masses in predetermined relation to each other. By employing dies of the proper size the starch masses may be of unitary weight. That is, each of the compressed masses of starch may be of a predetermined weight with respect to the desired concentration of starch per unit volume of water. Any quantity of laundry starch may be produced by adding the requisite number of the polyhedron masses to the proper volume of water. Heretofore it has been quite difficult to accurately measure the quantity of starch going into the laundry starch, particularly in the case of lump starch. By employing the starch cubes in the manner described, improved and more uniform results are obtained from the laundering standpoint and at the same time economy is effected by reason of the accuracy and ease of measurement.

The starch cubes are quite rapidly disintegrated by water. By merely touching the starch cube with water that portion of the cube which becomes wetted instantaneously swells and if the amount of water is sufficient the starch will crumble. The entire polyhedron mass disseminates upon submersion in water. I am unable definitely to account for the behavior of the formed starch masses. Micrographs of the starch masses formed with colored, dried corn syrup indicate that the dried corn syrup is distributed in small areas throughout the mass, seemingly between the granules of the starch, thereby acting to bind the particles of starch together at points without the accumulation in any particular spot of an undue quantity of the dried corn starch. This "spot welding" effect results in a considerably more rapid dissemination of the starch masses when subjected to water, since the water has access to the starch particles without first dissolving off a coating of protective material. The formed starch mass swells instantly upon touching water and water is rapidly absorbed to such an extent that the mass of starch falls apart. The rapidity of dissemination will depend upon such facts as the amount of pressure employed in forming the mass, the amount of binder and the amount of water employed. Water seems to penetrate the starch mass by capillary action, indicating the presence of interstices or pores extending into the mass.

The relatively dry or solid water-soluble carbohydrate, as well as the fatty acid employed in forming the polyhedron starch masses, enhances the characteristics of starch as well as assisting in the binding together of the starch particles. The composite mass constitutes a highly desirable laundry adjunct and will be found to have other uses of similar desirability. In certain cases the fatty acid will be eliminated or used in very small quantities.

Other changes in the process and article described herein by way of explanation of the invention may be made without departing from the scope of the invention as defined in the appended claims.

I claim:

1. A laundry adjunct, comprising solid starch composed of granules of starch combined together with dried finely divided particles of glucose and formed into a compressed mass.

2. A laundry adjunct, comprising solid starch composed of granules of starch combined with pre-dried particles of glucose binding agent and a high molecular weight fatty acid.

3. A laundry adjunct, comprising solid starch composed of granules of starch combined with finely divided dried glucose and stearic acid.

4. A laundry adjunct, comprising solid starch composed of granules of starch and dried glucose in an amount of the order of 4 per cent, said adjunct having a moisture content of the order of 13 to 14 per cent.

5. The process of forming masses of corn starch, which comprises mixing the particles of starch with a relatively small quantity of finely divided dried glucose, adding a relatively small quantity of water with the resulting mixture with agitation, and forming said mixture into compressed masses of the desired shape.

6. The process of forming a corn starch product, which comprises mixing particles of starch with dried glucose in an amount of the order of 4 per cent, adding a quantity of water to said mixture sufficient to provide a moisture content of the order of 13 to 14 per cent, agitating the mixture, and subjecting the mixture to compression to form the same into the desired shape.

7. The process of forming a laundry adjunct, which comprises compressing a mixture of starch and dry glucose into a mass of the desired shape, and maintaining said mass at a relatively low temperature during the compressing operation.

8. The process of forming starch masses, which comprises mixing starch with dried glucose, adding a small quantity of water to the mixture, and subjecting the mixture to compression within a relatively short time thereafter to form a solid mass of the desired shape.

9. A compressed starch pellet of the type described, comprising a compressed mass of corn starch particles containing and bonded together by an interspersion of pre-dried particles of glucose.

10. A compressed starch pellet, comprising a compressed mass of corn starch particles bonded together by spray-dried particles of glucose.

11. The process of forming compressed starch masses, which comprises mixing together particles of corn starch and a relatively small quantity of pulverulent pre-dried glucose to form a mixture having a moisture content below approximately 13 per cent, thereafter adding a sufficient quantity of water to said mixture to raise the moisture content thereof to the order of 13 to 14 per cent, and subjecting the mixture to compression to form a solid mass.

12. A unitary mass of powdery material of the type described, comprising a mixture containing a major quantity of finely divided solid particles intermingled with and bonded together by a minor quantity of pulverulent pre-dried glucose, said mixture being in the form of a compressed unitary body.

13. The method of forming a unitary mass of powdery materials, which comprises mixing a major quantity of a powdery material, the particles of which are to be bonded together with a minor quantity of pulverulent pre-dried glucose, and subjecting the resulting mixture to compression to form a unitary body.

HOWARD FILE.